United States Patent
Wu (10) Patent No.: US 9,743,319 B2
(45) Date of Patent: Aug. 22, 2017

(54) DEVICE AND METHOD OF HANDLING NETWORK CONFIGURATIONS

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 170 days.

(21) Appl. No.: 14/937,888

(22) Filed: Nov. 11, 2015

(65) Prior Publication Data

US 2016/0135095 A1 May 12, 2016

Related U.S. Application Data (60) Provisional application No. 62/078,925, filed on Nov. 12, 2014, provisional application No. 62/082,548, (Continued)

(51) Int. Cl.
*H04W 4/00* (2009.01)
*H04W 36/00* (2009.01)
(Continued)

(52) U.S. Cl.
CPC ....... *H04W 36/0027* (2013.01); *H04W 28/06* (2013.01); *H04W 36/0061* (2013.01); *H04W 36/28* (2013.01)

(58) Field of Classification Search
None
See application file for complete search history.

(56) References Cited

U.S. PATENT DOCUMENTS

2015/0173047 A1* 6/2015 Yamada .............. H04W 72/042
370/329
2015/0173120 A1* 6/2015 Yamada ............ H04W 36/0072
370/331
(Continued)

FOREIGN PATENT DOCUMENTS

JP 2014180045 A 9/2014
JP 2016518065 A 6/2016
(Continued)

OTHER PUBLICATIONS

Notice of allowance mailed Feb. 28, 2017 for the Japaese Application No. 2015-222119, filing date Nov. 12, 2015, pp. 1-3.
(Continued)

*Primary Examiner* — Otis L Thompson, Jr.
(74) *Attorney, Agent, or Firm* — Winston Hsu (57) ABSTRACT

A communication device for handling network configurations comprises a storage unit for storing instructions and a processing means coupled to the storage unit. The processing means is configured to execute the instructions stored in the storage unit. The instructions comprise receiving a radio resource control (RRC) message indicating a reconfiguration of at least one of a radio link control (RLC) configuration, a packet data convergence protocol (PDCP) configuration and a semi-persistent scheduling (SPS) configuration; performing the reconfiguration according to the RRC message, when at least one of following conditions is satisfied: the RRC message changes a secondary cell group (SCG) of the communication device, and the RRC message reconfigures a radio bearer from a SCG bearer to a MCG bearer; and stopping performing the reconfiguration, when none of the conditions is satisfied.

19 Claims, 7 Drawing Sheets

Related U.S. Application Data filed on Nov. 20, 2014, provisional application No. 62/104,096, filed on Jan. 16, 2015.

(51) Int. Cl.
*H04W 28/06* (2009.01)
*H04W 36/28* (2009.01)

(56) References Cited

U.S. PATENT DOCUMENTS

| | | | |
|---|---|---|---|
| 2015/0215826 A1* | 7/2015 | Yamada | H04W 36/0072 455/436 |
| 2015/0215945 A1* | 7/2015 | Hsu | H04L 47/21 370/254 |
| 2015/0215965 A1* | 7/2015 | Yamada | H04W 76/046 370/329 |
| 2015/0215987 A1* | 7/2015 | Kim | H04W 76/04 370/329 |
| 2015/0271726 A1* | 9/2015 | Kim | H04W 76/025 370/329 |
| 2015/0334769 A1* | 11/2015 | Kim | H04W 76/046 370/329 |
| 2016/0044606 A1* | 2/2016 | Yin | H04W 52/325 455/450 |
| 2016/0044639 A1* | 2/2016 | Yi | H04L 47/624 370/329 |
| 2016/0242193 A1* | 8/2016 | Hong | H04W 72/12 |
| 2016/0286412 A1* | 9/2016 | Kim | H04W 76/025 |
| 2017/0013668 A1* | 1/2017 | Chang | H04W 76/066 |

FOREIGN PATENT DOCUMENTS

| | | |
|---|---|---|
| WO | 2014163349 A1 | 10/2014 |
| WO | 2014166106 A1 | 10/2014 |

OTHER PUBLICATIONS

European Search report issued on Mar. 2, 2016 for EP application No. 15194076.4.
Samsung, "Overall PDCP operation in Dual-Connectivity", 3GPP TSG-RAN WG2 Meeting #87, R2-143081, Aug. 18-22, 2014, Dresden, Germany, XP050794208, pp. 1-5.
LG Electronics Inc., "PDCP/RLC handling at bearer type change", 3GPP TSG-RAN WG2 Meeting #87, R2-143729, Aug. 18-Aug. 22, 2014, Dresden, Germany, XP050794681, pp. 1-5.
Ericsson, "RRC procedures and L2 handling in dual connectivity", 3GPP TSG-RAN WG2 #87, TDOC R2-143505, Aug. 18-22, 2014, Dresden, Germany, XP050794508, pp. 1-6.
Search Report mailed/issued on Jun. 20, 2016 for EP application No. 15194076.4, pp. 1-13.
Nvidia, RRC and PDCP/RLC Interactions for Dual Connectivity, 3GPP TSG-RAN WG2 #88, R2-145227, Nov. 17-21, 2014, pp. 1-7, San Francisco, USA.
Office Action mailed on Nov. 1, 2016 for the Japanese Application No. 2015-222119, filed Nov. 12, 2015, pp. 1-4.
3GPP TS 36.300 V12.4.0 (Dec. 2014) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12).
3GPP TS 36.331 V12.4.1 (Dec. 2014) Technical Specification 3rd Generation Partnership Project; Technical Specification Group Radio Access Network; Evolved Universal Terrestrial Radio Access (E-UTRA); Radio Resource Control (RRC); Protocol specification (Release 12).
3GPP TS 36.323 V12.2.0 (Dec. 2014) Technical Specification 3rd Generation Partnership Project; Technical Specification Group Radio Access Network; Evolved Universal Terrestrial Radio Access (E-UTRA); Packet Data Convergence Protocol (PDCP) specification (Release 12).
3GPP TS 36.323 V12.1.0 (Sep. 2014) Technical Specification 3rd Generation Partnership Project; Technical Specification Group Radio Access Network; Evolved Universal Terrestrial Radio Access (E-UTRA); Packet Data Convergence Protocol (PDCP) specification (Release 12).
3GPP TS 36.331 V12.3.0 (Sep. 2014) Technical Specification 3rd Generation Partnership Project; Technical Specification Group Radio Access Network; Evolved Universal Terrestrial Radio Access (E-UTRA); Radio Resource Control (RRC); Protocol specification (Release 12).
3GPP TSG-RAN WG2 Meeting #88 R2-144660 San Francisco, USA, Nov. 17-21, 2014 CR-Form-v11 Change Request 36.300 CR CRNum rev—Current version: 12.3.0.
3GPP TSG-RAN2 Meeting #87 bis R2-144664 Shanghai, P.R. China, Oct. 6-10, 2014 CR-Form-v11 Change Request 36.331 CR CRNum rev'Current version: 12.3.0.
3GPP TSG-RAN2 Meeting #88 R2-145133 San Francisco, USA, Nov. 17-21, 2014 CR-Form-v11 Change Request 36.331 CR CRNum rev—Current version: 12.3.0.

\* cited by examiner

DEVICE AND METHOD OF HANDLING NETWORK CONFIGURATIONS

CROSS REFERENCE TO RELATED APPLICATIONS

This application claims the benefit of U.S. Provisional Application No. 62/078,925, filed on Nov. 12, 2014, the benefit of U.S. Provisional Application No. 62/082,548, filed on Nov. 20, 2014, and the benefit of U.S. Provisional Application No. 62/104,096, filed on Jan. 16, 2015.

BACKGROUND OF THE INVENTION

1. Field of the Invention

The present invention relates to a communication device used in a wireless communication system, and more particularly, to a communication device of handling network configurations in a wireless communication system.

2. Description of the Prior Art

A long-term evolution (LTE) system is developed by the 3GPP as a successor of the universal mobile telecommunication system (UMTS) for further enhancing performance of the UMTS to satisfy increasing needs of users. In the LTE system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway, etc., for Non-Access Stratum (NAS) control.

A LTE-advanced (LTE-A) system is an evolution of the LTE system. The LTE-A system improves performance at the coverage edge of an eNB, increases peak data rate and throughput by using advanced techniques such as carrier aggregation (CA), coordinated multipoint (CoMP) transmissions/reception, etc.

The UE may receive/transmit packets (e.g., transport blocks (TBs)) from/to two eNBs, when the UE is configured with a dual connectivity. Throughput of the UE is improved when the dual connectivity is operated. However, it is not clear how to perform a reconfiguration of a radio link control (RLC) configuration (i.e., rlc-config), a packet data convergence protocol (PDCP) configuration (i.e., pdcp-config) and/or a semi-persistent scheduling (SPS) configuration (i.e., sps-config) which is configured for a master cell group (MCG) and/or a secondary cell group (SCG) according to the dual connectivity.

On the other hand, according to the prior art, when a UE changes a primary secondary cell (PSCell) of a secondary eNB (SeNB) from a cell of the SeNB to another cell of the SeNB, or perform a handover from a master eNB (MeNB) to the SeNB, the UE resets a header compression/decompression protocol for a header compression/decompression of a radio bearer with a SCG bearer type. In other words, the UE reestablishes or resets a context for the header compression/decompression of PDCP service data units (SDUs) of the radio bearer. That is, the UE starts with an initialization & refresh (IR) state in U-mode in the header compression. The UE starts with no context state in the header decompression. Thus, efficiency of the header compression/decompression is decreased.

SUMMARY OF THE INVENTION

The present invention therefore provides a communication device and method for handling network configurations to solve the abovementioned problem.

A communication device for handling network configurations comprises a storage unit for storing instructions and a processing means coupled to the storage unit. The processing means is configured to execute the instructions stored in the storage unit. The instructions comprise receiving a first configuration configuring a first radio bearer as a master cell group (MCG) bearer from a first base station, wherein the first configuration is for communicating with the first base station; receiving a second configuration configuring a second radio bearer as a secondary cell group (SCG) bearer from the first base station, wherein the second configuration comprises at least one of a radio link control (RLC) configuration, a packet data convergence protocol (PDCP) configuration and a semi-persistent scheduling (SPS) configuration for communicating with a second base station; receiving a radio resource control (RRC) message indicating a reconfiguration of the at least one of the RLC configuration, the PDCP configuration and the SPS configuration; performing the reconfiguration according to the RRC message, when at least one of following conditions is satisfied: the RRC message changes a SCG of the communication device; and the RRC message reconfigures the second radio bearer from the SCG bearer to the MCG bearer; and stopping performing the reconfiguration, when none of the conditions is satisfied.

A first base station for handling network configurations comprises a storage unit for storing instructions and a processing means coupled to the storage unit. The processing means is configured to execute the instructions stored in the storage unit. The instructions comprise transmitting a first configuration configuring a first radio bearer as a master cell group (MCG) bearer to a communication device, wherein the first configuration is for communicating with the first base station; transmitting a second configuration configuring a second radio bearer as a secondary cell group (SCG) bearer to the communication device, wherein the second configuration comprises at least one of a radio link control (RLC) configuration, and a packet data convergence protocol (PDCP) configuration and a semi-persistent scheduling (SPS) configuration for communicating with a second base station; determining to reconfigure the at least one of the RLC configuration, the PDCP configuration and the SPS configuration; and transmitting a radio resource control (RRC) message indicating a reconfiguration of the at least one of the RLC configuration and the PDCP configuration according to the determination, wherein the RRC message changes a SCG of the communication device or the RRC message reconfigures the second radio bearer from the SCG bearer to the MCG bearer.

A communication device for handling a header compression/decompression comprises a storage unit for storing instructions and a processing means coupled to the storage unit. The processing means is configured to execute the instructions stored in the storage unit. The instructions comprise receiving a first radio bearer configuration configuring a first radio bearer as a secondary cell group (SCG) bearer and a primary secondary cell (PSCell) configuration configuring a cell of a first base station as a PSCell, wherein the first radio bearer configuration and the PSCell configuration are for communicating with the first base station; receiving a second radio bearer configuration configuring a second radio bearer as a master cell group (MCG) bearer or a split bearer for communicating with a second base station; establishing a header compression context for compressing a first plurality of packet data convergence protocol (PDCP) service data units (SDUs) of the first radio bearer, and/or establishing a header decompression context for decompressing a second plurality of PDCP SDUs of the first radio bearer; compressing the first plurality of PDCP SDUs into a first plurality of compressed PDCP SDUs according to the header compression context and transmitting the first plurality of compressed PDCP SDUs to the first base station, and/or receiving the second plurality of PDCP SDUs from the first base station and decompressing the second plurality of PDCP SDUs into a second plurality of decompressed PDCP SDUs according to the header decompression context; transmitting a plurality of PDCP SDUs of the second radio bearer to the second base station; receiving a radio resource control (RRC) message changing the PSCell from the cell of the first base station to another cell of the first base station or indicating a handover from the second base station to the first base station; maintaining the header compression context or the header decompression context, when receiving the RRC message; and compressing a third plurality of PDCP SDUs of the first radio bearer into a third plurality of compressed PDCP SDUs according to the header compression context and transmitting the third plurality of compressed PDCP SDUs to the first base station, after receiving the RRC message, and/or receiving a fourth plurality of PDCP SDUs of the first radio bearer and decompressing the fourth plurality of PDCP SDUs into a fourth plurality of decompressed PDCP SDUs according to the header decompression context, after receiving the RRC message.

A method of handling a header compression/decompression for a first base station and a second base station comprises the second base station transmitting a first radio bearer configuration configuring a first radio bearer as a secondary cell group (SCG) bearer and a primary secondary cell (PSCell) configuration configuring a cell of the first base station as a PSCell to a communication device, wherein the first radio bearer configuration and the PSCell configuration are for communicating with the communication device; the second base station transmitting a second radio bearer configuration for configuring a second radio bearer as a master cell group (MCG) bearer or a split bearer for communicating with the communication device to the communication device; the first base station establishing a header compression context for compressing a first plurality of packet data convergence protocol (PDCP) service data units (SDUs) of the first radio bearer, and/or establishing a header decompression context for decompressing a second plurality of PDCP SDUs of the first radio bearer; the first base station compressing the first plurality of PDCP SDUs into a first plurality of compressed PDCP SDUs according to the header compression context and transmitting the first plurality of compressed PDCP SDUs to the communication device, and/or receiving the second plurality of PDCP SDUs from the communication device and decompressing the second plurality of PDCP SDUs into a second plurality of decompressed PDCP SDUs according to the header decompression context; the second base station transmitting or receiving a plurality of PDCP SDUs of the second radio bearer to the communication device; the second base station transmitting a radio resource control (RRC) message changing the PSCell from the cell of the first base station to another cell of the first base station or indicating a handover from the second base station to the first base station; the first base station maintaining the header compression context or the header decompression context, when initiating changing the PSCell or initiating the handover; and the first base station compressing a third plurality of PDCP SDUs of the first radio bearer into a third plurality of compressed PDCP SDUs according to the header compression context and transmitting the third plurality of compressed PDCP SDUs to the communication device, after receiving the RRC message, and/or receiving a fourth plurality of PDCP SDUs of the first radio bearer from the communication device and decompressing the fourth plurality of PDCP SDUs into a fourth plurality of decompressed PDCP SDUs according to the header decompression context, after receiving the RRC message.

A communication device for handling a header compression/decompression comprises a storage unit for storing instructions and a processing means coupled to the storage unit. The processing means is configured to execute the instructions stored in the storage unit. The instructions comprise receiving a radio resource control (RRC) message; performing a packet data convergence protocol (PDCP) re-establishment for a first radio bearer and a second radio bearer according to the RRC message; resetting a first compression/decompression context of the first radio bearer and a second compression/decompression context of the second radio bearer according to the PDCP re-establishment, if the RRC message does not comprise a field indicating continuing compression/decompression context; and resetting the first compression/decompression context and not resetting the second compression/decompression context according to the PDCP re-establishment, if the RRC message comprises the field indicating continuing compression/decompression context.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
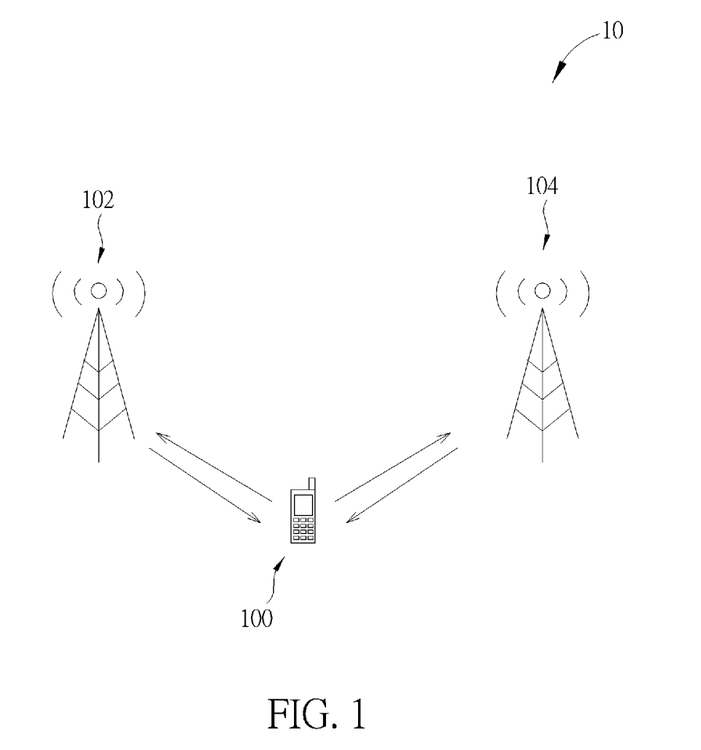
FIG. 1 is a schematic diagram of a wireless communication system according to an example of the present invention.

FIG. 1 is a schematic diagram of a wireless communication system 10 according to an example of the present invention. The wireless communication system 10 is briefly composed of a communication device 100 and base stations 102 and 104. In FIG. 1, the communication device 100, the base stations 102 and 104 and are simply utilized for illustrating the structure of the wireless communication system 10. Practically, the base station 102 and/or the base station 104 may be an evolved NB (eNB) and/or a relay station in an evolved UTRAN (E-UTRAN), a long term evolution (LTE) system, a LTE-Advanced (LTE-A) system or an evolution of the LTE-A system. In FIG. 1, coverage areas of the base station 102 and the base station 104 may be partly overlapped.

As shown in FIG. 1, the communication device 100 may be configured to communicate with the base station 102 and the base station 104 at the same time according to a dual connectivity configured to the communication device 100. That is, the communication device 100 may perform a transmission/reception via both the base stations 102 and 104. For example, the communication device 100 may receive packets (e.g., transport blocks (TBs)) from the base stations 102 and 104 according to the dual connectivity, or the communication device 100 may transmit packets (e.g., TBs) to the base stations 102 and 104 according to the dual connectivity. In general, it means that the communication device 100 receives the packets from at least one cell of the base station 102 and at least one cell of the base station 104 according to the dual connectivity, when the communication device 100 receives the packets from both the base stations 102 and 104. Similarly, it means that the communication device 100 transmits the packets to at least one cell of the base station 102 and/or at least one cell of the base station 104 according to the dual connectivity, when the communication device 100 transmits the packets to both the base stations 102 and 104. In addition, one of the base stations 102 and 104 may be a master eNB (MeNB) and the other base station be a secondary eNB (SeNB) according to the dual connectivity defined in 3rd Generation Partnership Project (3GPP). One of the cell (s) of the MeNB communicating with the communication device 100 may be a primary cell (PCell) and the other cell(s) (if available) of the MeNB may be secondary cell(s) (SCell(s)). One of the cell(s) of the SeNB communicating with the communication device 100 may be a primary SCell (PSCell), and the other cell(s) (if available) of the SeNB may be SCell(s).

The communication device 100 may be a user equipment (UE), a low cost device (e.g., machine type communication (MTC) device), a device-to-device (D2D) device, a mobile phone, a laptop, a tablet computer, an electronic book, a portable computer system, a vehicle, an airplane, or combination thereof. In addition, the communication device 100, the base station 102 or the base station 104 may be seen as a transmitter or a receiver according to its transmission direction, e.g., for an uplink (UL), the communication device 100 is the transmitter and the base station 102 and/or the base station 104 is the receiver, and for a downlink (DL), the base station 102 and/or the base station 104 is the transmitter and the communication device 100 is the receiver.

Figure 2:
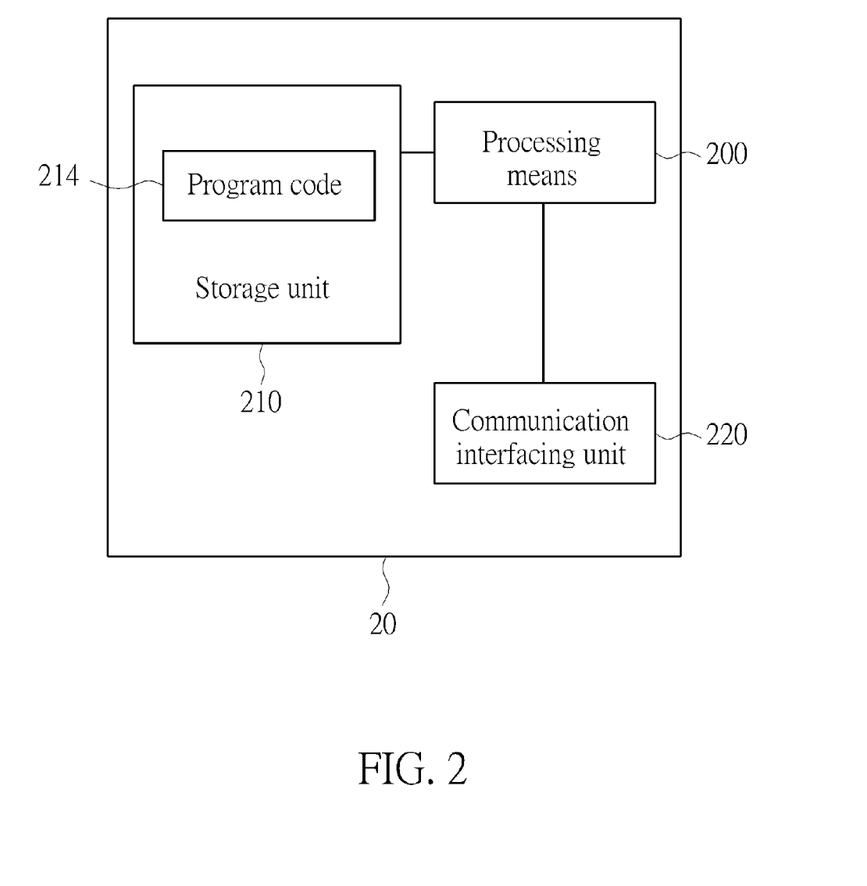
FIG. 2 is a schematic diagram of a communication device according to an example of the present invention.

FIG. 2 is a schematic diagram of a communication device 20 according to an example of the present invention. The communication device 20 may be the communication device 100, the base station 102 and/or the base station 104 shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage unit, non-transitory computer-readable medium (e.g., tangible media), etc. The communication interfacing unit 220 is preferably a transceiver and is used to transmit and receive signals (e.g., data, signals, messages and/or packets) according to processing results of the processing means 200.

Figure 3:
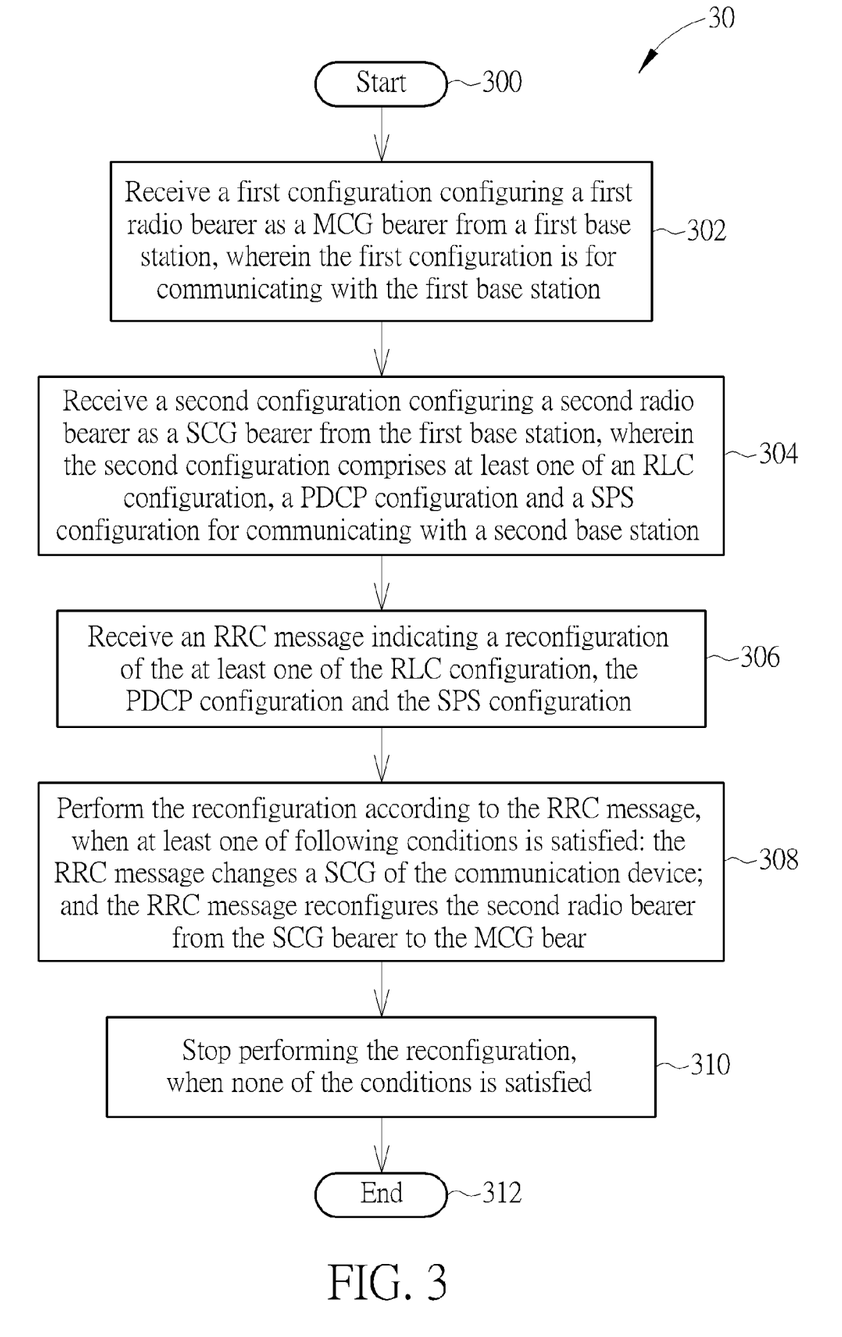
FIG. 3 is a flowchart of a process according to an example of the present invention.

FIG. 3 is a flowchart of a process 30 according to an example of the present invention. The process 30 may be utilized in a communication device (e.g., the communication device 100), to handle network configurations. The process 30 may be compiled into the program code 214 and includes the following steps:

Step 300: Start.

Step 302: Receive a first configuration configuring a first radio bearer as a master cell group (MCG) bearer from a first base station, wherein the first configuration is for communicating with the first base station.

Step 304: Receive a second configuration configuring a second radio bearer as a secondary cell group (SCG) bearer from the first base station, wherein the second configuration comprises at least one of a radio link control (RLC) configuration, a packet data convergence protocol (PDCP) configuration and a semi-persistent scheduling (SPS) configuration for communicating with a second base station.

Step 306: Receive a radio resource control (RRC) message indicating a reconfiguration of the at least one of the RLC configuration, the PDCP configuration and the SPS configuration.

Step 308: Perform the reconfiguration according to the RRC message, when at least one of following conditions is satisfied: the RRC message changes a SCG of the communication device; and the RRC message reconfigures the second radio bearer from the SCG bearer to the MCG bear.

Step 310: Stop performing the reconfiguration, when none of the conditions is satisfied.

Step 312: End.

According to the process 30, the communication device receives a first configuration configuring a first radio bearer as a MCG bearer from a first base station (e.g., the base station 102), wherein the first configuration is for communicating with the first base station. The communication device receives a second configuration configuring a second radio bearer as a SCG bearer from the first base station while the communication device is configured the first radio bearer, wherein the second configuration may include at least one of a RLC configuration, a PDCP configuration and a SPS configuration for communicating with a second base station (e.g., the base station 104). Later, the communication device receives an RRC message indicating a reconfiguration of the at least one of the RLC configuration, the PDCP configuration and the SPS configuration. Then, the communication device performs the reconfiguration according to the RRC message, when at least one of following conditions is satisfied: the RRC message changes a SCG of the communication device (i.e., SCG change or PSCell change), and the RRC message reconfigures the second radio bearer from the SCG bearer to the MCG bear (Note that this condition may not be applied to the reconfiguration of the SPS configuration). In addition, the communication device may stop performing the reconfiguration, when none of the conditions is satisfied.

In other words, the first base station transmits an RRC message which includes a configuration reconfiguring at least one of a PDCP configuration and a RLC configuration of a SCG bearer, and the RRC message changes the SCG (i.e., SCG change occurs). When the communication device receives the RRC message and determines the RRC message indicates the SCG change, the communication device performs the reconfiguration according to the configuration. If the RRC message does not indicate the SCG change, the communication device does not perform the reconfiguration. Please note that the first base station may transmit the first configuration to the communication device in a first RRC message, e.g., RRCConnectionReconfiguration message. The first base station may transmit the second configuration to the communication device in a second RRC message, e.g. RRCConnectionReconfiguration message. The second configuration may be included in a SCG configuration in the second RRC message, and the SCG configuration may include cell identity information (e.g., cell global identifier, physical cell identity and/or downlink carrier frequency) identifying a cell of the second base station.

Realization of the process 30 is not limited to the above description.

In one example, the conditions in the process 30 may include that the RRC message is a first message after an RRC connection re-establishment, and the RRC message is a handover message. Further, the conditions may include that the RRC message reconfigures the second radio bearer from the SCG bearer to a split bearer. In one example, the communication device may perform an RRC connection re-establishment procedure, when the communication device stops performing the reconfiguration. In one example, the communication device may stop performing the reconfiguration by ignoring the reconfiguration.

In one example, the step of performing the reconfiguration may include applying the RLC configuration, and the communication device may further reestablish a RLC entity of the second radio bearer in response to the RRC message. In one example, the step of performing the reconfiguration may include applying the PDCP configuration, and the communication device may further reestablish a PDCP entity of the second radio bearer in response to the RRC message. In one example, the step of performing the reconfiguration may include applying the SPS configuration, and the communication device may further reset a MAC entity of the second radio bearer in response to the RRC message.

Figure 4:
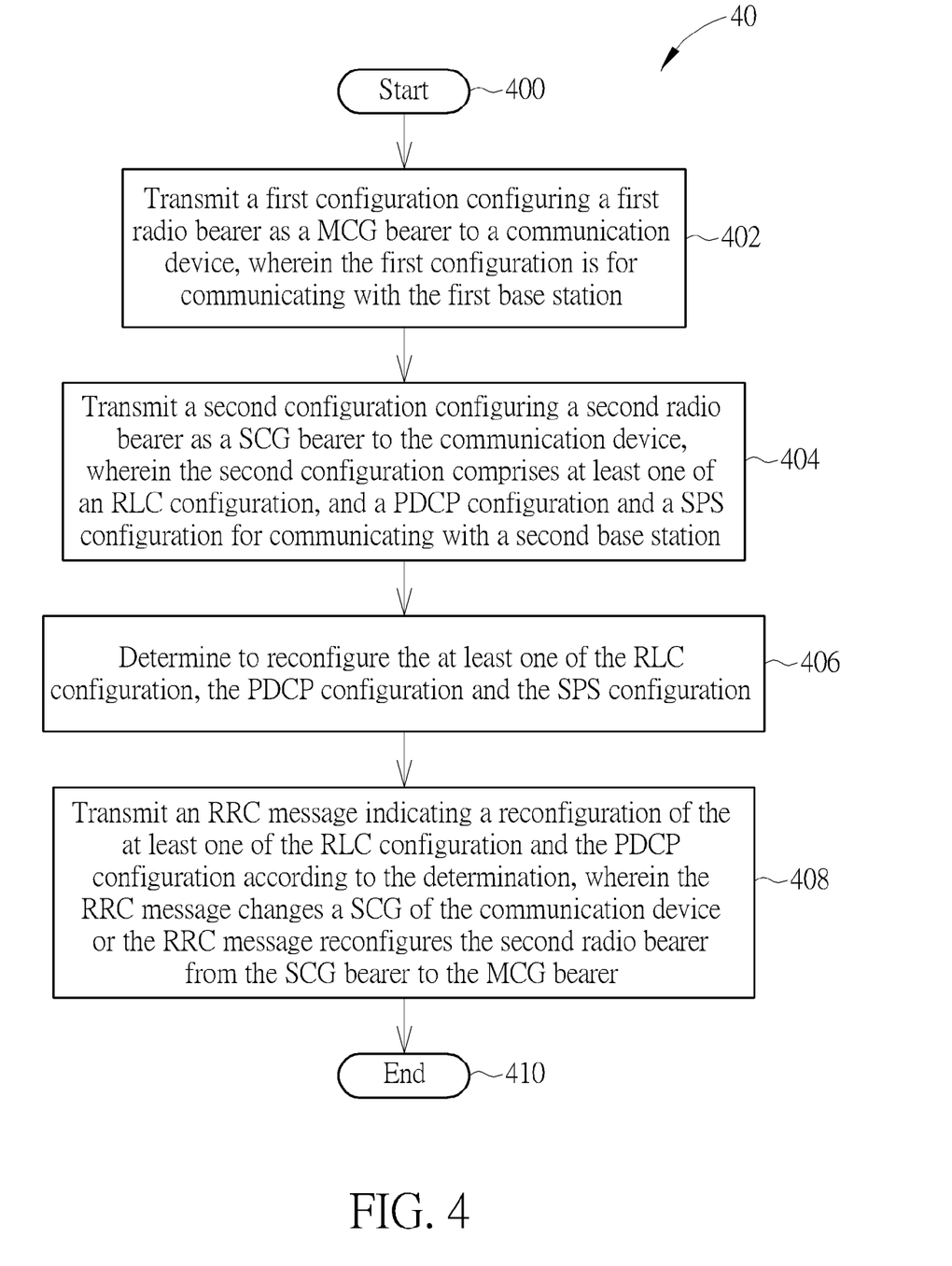
FIG. 4 is a flowchart of a process according to an example of the present invention.

FIG. 4 is a flowchart of a process 40 according to an example of the present invention. The process 40 may be utilized in a first base station (e.g., the base station 102 or the base station 104), to handle network configurations. The process 40 may be compiled into the program code 214 and includes the following steps:

Step 400: Start.

Step 402: Transmit a first configuration configuring a first radio bearer as a MCG bearer to a communication device, wherein the first configuration is for communicating with the first base station.

Step 404: Transmit a second configuration configuring a second radio bearer as a SCG bearer to the communication device, wherein the second configuration comprises at least one of an RLC configuration, and a PDCP configuration and a SPS configuration for communicating with a second base station.

Step 406: Determine to reconfigure the at least one of the RLC configuration, the PDCP configuration and the SPS configuration.

Step 408: Transmit an RRC message indicating a reconfiguration of the at least one of the RLC configuration and the PDCP configuration according to the determination, wherein the RRC message changes a SCG of the communication device or the RRC message reconfigures the second radio bearer from the SCG bearer to the MCG bearer.

Step 410: End.

According to the process 40, the first base station transmits a first configuration configuring a first radio bearer as a MCG bearer to a communication device (e.g., the communication device 100), wherein the first configuration is for communicating with the first base station. The first base station transmits a second configuration configuring a second radio bearer as a SCG bearer to the communication device while the communication device is configured the first radio bearer, wherein the second configuration may include at least one of an RLC configuration, and a PDCP configuration and a SPS configuration for communicating with a second base station (e.g., the base station 102 or the base station 104). Later, the first base station determines to reconfigure the at least one of the RLC configuration, the PDCP configuration and the SPS configuration. Then, the first base station transmits an RRC message indicating a reconfiguration of the at least one of the RLC configuration and the PDCP configuration according to the determination, wherein the RRC message changes a SCG of the communication device or the RRC message reconfigures the second radio bearer from the SCG bearer to the MCG bearer. The process 40 may be used for interacting with the process 30, but is not limited herein. That is, the first base station, the second base station and the communication device in the process 40 may be seen as those in the process 30.

An example related to the process 40 is illustrated as follows. A network (e.g., the first base station or the second base station) may determine to change a PDCP configuration (e.g., PDCP SN size) or a RLC configuration (e.g., RLC SN size) because of increasing data rate, decreasing data rate, a MeNB not supporting a PDCP/RLC configuration configured by a SeNB, or the SeNB not supporting a PDCP/RLC configuration configured by a previous SeNB. When a communication device receives an RRC message including the PDCP configuration for a second radio bearer and the RRC message changes a SCG of the communication device or reconfigures the second radio bearer from a SCG bearer to a MCG bearer, the communication device reestablishes a PDCP entity of the second radio bearer and applies the PDCP configuration to the PDCP entity of the second radio bearer. After transmitting the RRC message, the network also reestablishes a PDCP entity of the second radio bearer and applies the PDCP configuration to the PDCP entity of the second radio bearer. This makes the communication device synchronizes with the network to apply a new parameter (e.g., new PDCP SN size) in the PDCP configuration. If the PDCP entity is not reestablished, the communication device may still apply an old parameter (e.g., old PDCP SN size) to transmit a PDCP PDU to the network after the network transmits the PDCP configuration. Accordingly, the network may also still apply the old parameter.

Similarly, when the communication device receives the RRC message including a RLC configuration for a second radio bearer, and the RRC message changes a SCG of the communication device or reconfigures the second radio bearer from a SCG bearer to a MCG bearer, the communication device reestablishes an RLC entity of the second radio bearer and applies the RLC configuration to the RLC entity of the second radio bearer. After transmitting the RRC message, the network also reestablishes a RLC entity of the second radio bearer and applies the RLC configuration to the RLC entity of the second radio bearer. This makes the communication device synchronizes with the network to apply a new parameter (e.g., new RLC SN size) in the RLC configuration. If the RLC entity is not re-established, the communication device may still apply an old parameter (e.g., old RLC SN size) to transmit a RLC PDU to the network after the network transmits the RLC configuration. Accordingly, the network may also still apply the old parameter.

Similarly, the network may transmit another RRC message which reconfigures at least one of a RLC configuration and a PDCP configuration, when the network reconfigures a third radio bearer which is a MCG bearer to a SCG bearer. In this situation, the communication device reestablishes a PDCP entity and a RLC entity of the third radio bearer in response to the other RRC message. It should be noted that if the network determines to reconfigure a PDCP configuration of a split bearer, the network may use a handover procedure by transmitting a RRC message including a MobilityControlInfo information element. If the network determines to reconfigure a RLC configuration of a SCG RLC entity of a split bearer, the network may transmit a RRC message changing a PSCell of the communication device.

It should be noted that the network may not perform a reconfiguration of a PDCP configuration for a SCG bearer by using a RRC message which does not triggers the communication device to perform a PDCP re-establishment for the SCG bearer. The network may not perform a reconfiguration of a RLC configuration for a SCG RLC entity of a split bearer by using a RRC message which does not triggers the communication device to perform a RLC re-establishment for the SCG RLC entity of the split bearer.

In one example, the PDCP configuration in the process 30 and/or 40 may include at least one of a PDCP timer value and a PDCP Sequence Number (SN) size, the RLC configuration may include at least one of a RLC timer value, a counter value, a RLC Length Indicator (LI) size and a RLC SN size, and the SPS configuration may include at least one of a SPS Cell Radio Network Temporary Identifier (C-RNTI) and a SPS interval. In one example, the RRC message changing the SCG may be an RRCConnectionReconfiguraiton message including a MobilityControlInfoSCG information element which may include at least one of t307, a C-RNTI and RACH-ConfigDedicated. In one example, the reconfiguration of the at least one of the RLC configuration, the PDCP configuration and the SPS configuration may include a change of at least one of a PDCP timer value, a PDCP SN size, a RLC timer value, a counter value, a RLC LI size, a RLC SN size, a SPS C-RNTI, and a SPS interval. In one example, the second configuration may include DRB-ToAddModSCG including a data radio bearer (DRB) identity identifying the second radio bearer, and the RRC message reconfiguring the second radio bearer from the SCG bearer to the MCG bearer is an RRCConnectionReconfiguraiton message including drb-ToAddMod which may include the DRB identity of the second radio bearer.

Figure 5:
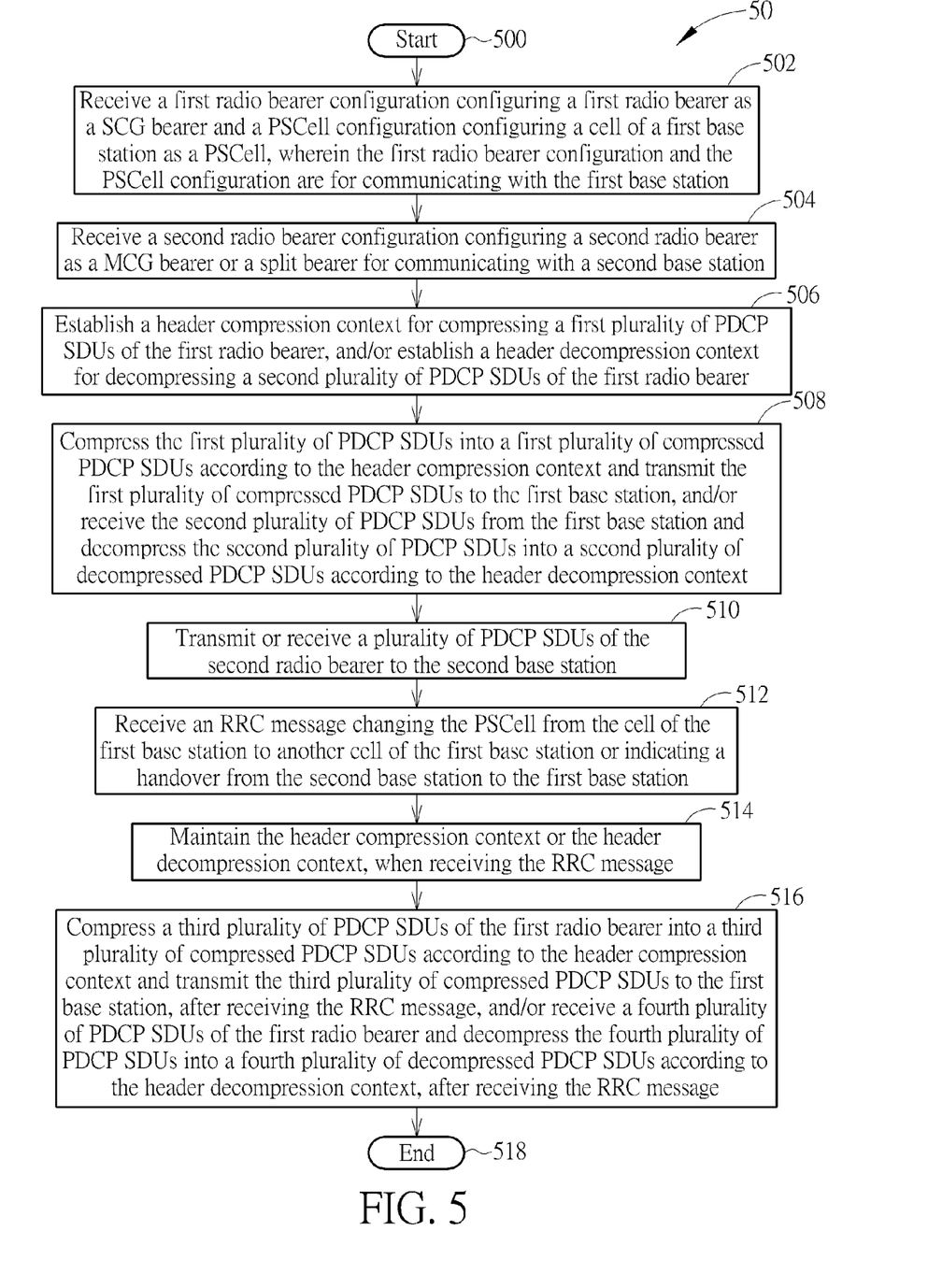
FIG. 5 is a flowchart of a process according to an example of the present invention.

FIG. 5 is a flowchart of a process 50 according to an example of the present invention. The process 50 may be utilized in a communication device (e.g., the communication device 100), to handle a header compression/decompression. The process 50 may be compiled into the program code 214 and includes the following steps:

Step 500: Start.

Step 502: Receive a first radio bearer configuration configuring a first radio bearer as a SCG bearer and a PSCell configuration configuring a cell of a first base station as a PSCell, wherein the first radio bearer configuration and the PSCell configuration are for communicating with the first base station.

Step 504: Receive a second radio bearer configuration configuring a second radio bearer as a MCG bearer or a split bearer for communicating with a second base station.

Step 506: Establish a header compression context for compressing a first plurality of PDCP service data units (SDUs) of the first radio bearer, and/or establish a header decompression context for decompressing a second plurality of PDCP SDUs of the first radio bearer.

Step 508: Compress the first plurality of PDCP SDUs into a first plurality of compressed PDCP SDUs according to the header compression context and transmit the first plurality of compressed PDCP SDUs to the first base station, and/or receive the second plurality of PDCP SDUs from the first base station and decompress the second plurality of PDCP SDUs into a second plurality of decompressed PDCP SDUs according to the header decompression context.

Step 510: Transmit or receive a plurality of PDCP SDUs of the second radio bearer to the second base station.

Step 512: Receive an RRC message changing the PSCell from the cell of the first base station to another cell of the first base station or indicating a handover from the second base station to the first base station.

Step 514: Maintain the header compression context or the header decompression context, when receiving the RRC message.

Step 516: Compress a third plurality of PDCP SDUs of the first radio bearer into a third plurality of compressed PDCP SDUs according to the header compression context and transmit the third plurality of compressed PDCP SDUs to the first base station, after receiving the RRC message, and/or receive a fourth plurality of PDCP SDUs of the first radio bearer and decompress the fourth plurality of PDCP SDUs into a fourth plurality of decompressed PDCP SDUs according to the header decompression context, after receiving the RRC message.

Step 518: End.

According to the process 50, the communication device may receive a first radio bearer configuration configuring a first radio bearer as a SCG bearer and a PSCell configuration configuring a cell of a first base station (e.g., SeNB, which may be the base station 102 or the base station 104) as a PSCell, wherein the first radio bearer configuration and the PSCell configuration are for communicating with the first base station. The communication device may receive a second radio bearer configuration configuring a second radio bearer as a MCG bearer or a split bearer for communicating with a second base station (e.g., MeNB, which may be the base station 102 or the base station 104). Thus, the communication device is configured with both the first bearer and second radio bearer. Then, the communication device may establish a header compression for compressing a first plurality of PDCP SDUs of the first radio bearer. Or, the communication device may establish a header decompression context for decompressing a second plurality of PDCP SDUs of the first radio bearer. The communication device may compress the first plurality of PDCP SDUs into a first plurality of compressed PDCP SDUs according to the header compression context, and may transmit the first plurality of compressed PDCP SDUs to the first base station. Or, the communication device may receive the second plurality of PDCP SDUs from the first base station, and may decompress the second plurality of PDCP SDUs into a second plurality of decompressed PDCP SDUs according to the header decompression context. The communication device may transmit (or receive) a plurality of PDCP SDUs of the second radio bearer to the second base station. Later, the communication device may receive an RRC message changing the PSCell from the cell of the first base station to another cell of the first base station (i.e., PSCell change within the SCG of the first base station) or indicating a handover from the second base station to the first base station. The communication device may maintain (i.e., keep) the header compression context or the header decompression context, when receiving the RRC message. The communication device may compress a third plurality of PDCP SDUs of the first radio bearer into a third plurality of compressed PDCP SDUs according to the header compression context and may transmit the third plurality of compressed PDCP SDUs to the first base station, after receiving the RRC message. Or, the communication device may receive a fourth plurality of PDCP SDUs of the first radio bearer and may decompress the fourth plurality of PDCP SDUs into a fourth plurality of decompressed PDCP SDUs according to the header decompression context, after receiving the RRC message.

According to process 50, when a communication device changes a PSCell of a SeNB from a cell of the SeNB to another cell of the SeNB or when the communication device performs a handover from a MeNB to a SeNB, the communication device does not reset a header compression/decompression context for a header compression/decompression for a radio bearer with a SCG bearer type. Hence, the communication device does not need to start a header compression/decompression with an initialization & refresh (IR) state in U-Mode. Please note that the second base station may transmit the first radio bearer configuration and the PSCell configuration to the communication device in a first RRC message, e.g., RRCConnectionReconfiguration message. The PSCell configuration may include cell identity information (e.g., cell global identifier, physical cell identity and/or downlink carrier frequency) identifying the cell of the second base station. The second base station may transmit the second radio bearer configuration to the communication device in a second RRC message, e.g., RRCConnectionReconfiguration message.

Figure 6:
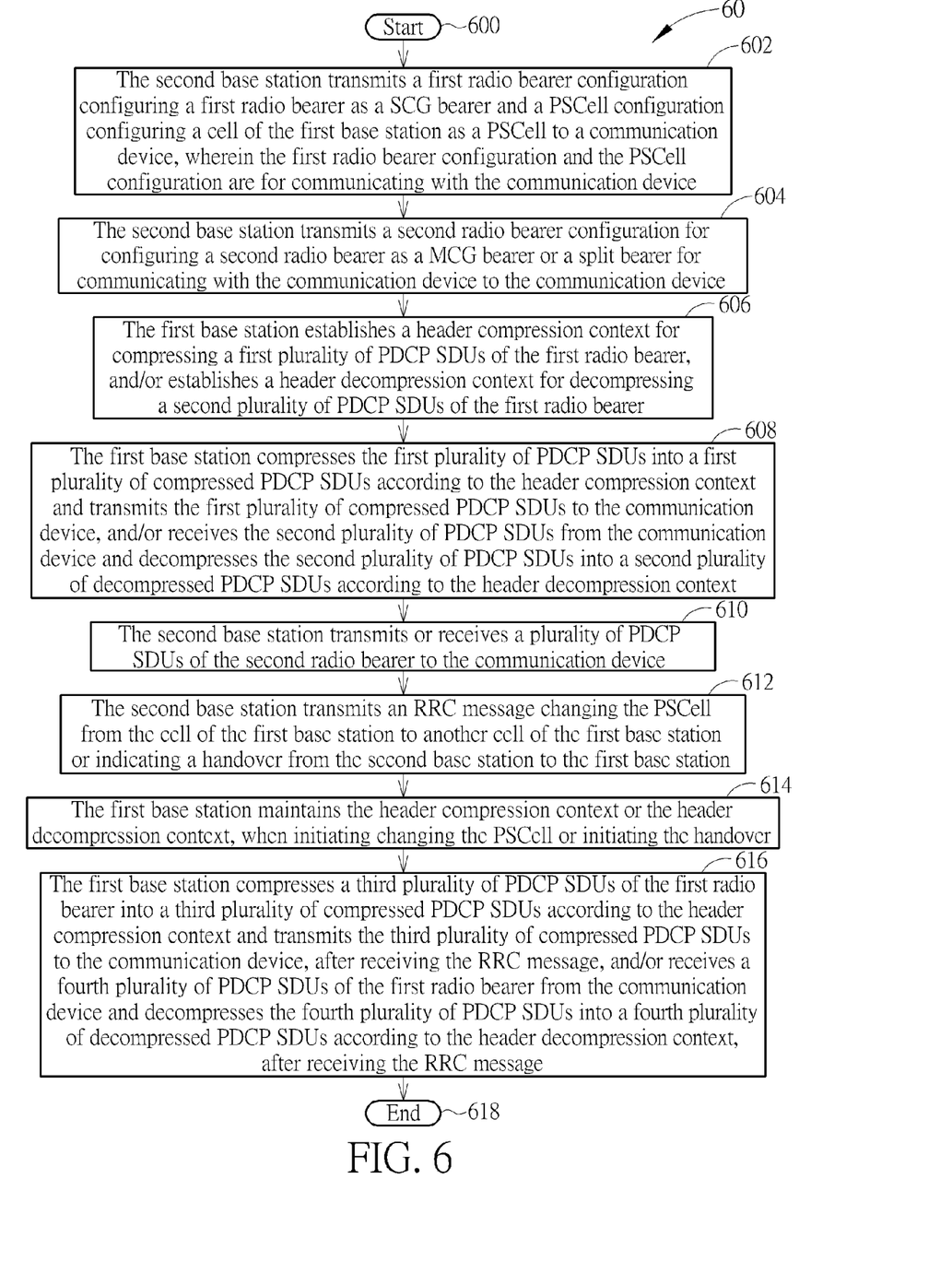
FIG. 6 is a flowchart of a process according to an example of the present invention.

FIG. 6 is a flowchart of a process 60 according to an example of the present invention. The process 60 may be utilized in a first base station (e.g., SeNB, which may be the base station 102 or the base station 104) and a second base station (e.g., MeNB, which may be the base station 102 or the base station 104), to handle a header compression/decompression. The process 60 may be compiled into the program code 214 and includes the following steps:

Step 600: Start.

Step 602: The second base station transmits a first radio bearer configuration configuring a first radio bearer as a SCG bearer and a PSCell configuration configuring a cell of the first base station as a PSCell to a communication device, wherein the first radio bearer configuration and the PSCell configuration are for communicating with the communication device.

Step 604: The second base station transmits a second radio bearer configuration for configuring a second radio bearer as a MCG bearer or a split bearer for communicating with the communication device to the communication device.

Step 606: The first base station establishes a header compression context for compressing a first plurality of PDCP SDUs of the first radio bearer, and/or establishes a header decompression context for decompressing a second plurality of PDCP SDUs of the first radio bearer.

Step 608: The first base station compresses the first plurality of PDCP SDUs into a first plurality of compressed PDCP SDUs according to the header compression context and transmits the first plurality of compressed PDCP SDUs to the communication device, and/or receives the second plurality of PDCP SDUs from the communication device and decompresses the second plurality of PDCP SDUs into a second plurality of decompressed PDCP SDUs according to the header decompression context.

Step 610: The second base station transmits or receives a plurality of PDCP SDUs of the second radio bearer to the communication device.

Step 612: The second base station transmits an RRC message changing the PSCell from the cell of the first base station to another cell of the first base station or indicating a handover from the second base station to the first base station.

Step 614: The first base station maintains the header compression context or the header decompression context, when initiating changing the PSCell or initiating the handover.

Step 616: The first base station compresses a third plurality of PDCP SDUs of the first radio bearer into a third plurality of compressed PDCP SDUs according to the header compression context and transmits the third plurality of compressed PDCP SDUs to the communication device, after receiving the RRC message, and/or receives a fourth plurality of PDCP SDUs of the first radio bearer from the communication device and decompresses the fourth plurality of PDCP SDUs into a fourth plurality of decompressed PDCP SDUs according to the header decompression context, after receiving the RRC message.

Step 618: End.

According to the process 60, the second base station may transmit a first radio bearer configuration configuring a first radio bearer as a SCG bearer and a PSCell configuration configuring a cell of the first base station as a PSCell to a communication device (e.g., the communication device 100), wherein the first radio bearer configuration and the PSCell configuration are for communicating with the communication device. The second base station may transmit a second radio bearer configuration for configuring a second radio bearer as a MCG bearer or a split bearer for communicating with the communication device to the communication device. Then, the first base station may establish a header compression context for compressing a first plurality of PDCP SDUs of the first radio bearer. Or, the first base station may establish a header decompression context for decompressing a second plurality of PDCP SDUs of the first radio bearer. The first base station may compress the first plurality of PDCP SDUs into a first plurality of compressed PDCP SDUs according to the header compression context, and may transmit the first plurality of compressed PDCP SDUs to the communication device. Or, the first base station may receive the second plurality of PDCP SDUs from the communication device, and may decompress the second plurality of PDCP SDUs into a second plurality of decompressed PDCP SDUs according to the header decompression context. The second base station may transmit (or receive) a plurality of PDCP SDUs of the second radio bearer to the communication device. Later, the second base station may transmit an RRC message changing the PSCell from the cell of the first base station to another cell of the first base station or indicating a handover from the second base station to the first base station. The first base station may maintain the header compression context or the header decompression context, when initiating changing the PSCell or initiating the handover. The first base station may compress a third plurality of PDCP SDUs of the first radio bearer into a third plurality of compressed PDCP SDUs according to the header compression context and may transmit the third plurality of compressed PDCP SDUs to the communication device, after receiving the RRC message. Or, the first base station may receive a fourth plurality of PDCP SDUs of the first radio bearer from the communication device and may decompress the fourth plurality of PDCP SDUs into a fourth plurality of decompressed PDCP SDUs according to the header decompression context, after receiving the RRC message.

According to the process 60, when an MeNB or an SeNB changes a PSCell of the SeNB from a cell of the SeNB to another cell of the SeNB for a communication device or when the MeNB indicates the communication device to perform a handover from the MeNB to the SeNB, the SeNB does not reset a header compression/decompression context for a header compression/decompression for a radio bearer with a SCG bearer type. Hence, the SeNB does not need to start a header compression/decompression with an IR state in U-Mode. The PSCell configuration may include cell identity information (e.g. cell global identifier, physical cell identity and/or downlink carrier frequency) identifying the cell of the SeNB. The MeNB may transmit the second radio bearer configuration to the communication device in a second RRC message, e.g., RRCConnectionReconfiguration message.

Realization of the process 50 and/or 60 is not limited to the above description.

In one example, the header compression/decompression context for compressing/decompressing the first plurality of PDCP SDUs in the process 50 and/or 60 includes a plurality of static fields in one or more protocol headers of the first plurality of PDCP SDUs. Further, the header compression/decompression context may store at least one of dynamic field and change pattern. In one example, the first radio bearer configuration may include at least one of a radio bearer identity, a PDCP configuration (e.g., header compression/decompression configuration), a RLC configuration, a logical channel identity and a logical channel configuration. Similarly, the second radio bearer configuration may include at least one of a radio bearer identity, a PDCP configuration, a RLC configuration, a logical channel identity and a logical channel configuration. In one example, the RRC message may be an RRCConnectionReconfiguration message. In one example, the communication device or the first base station may update the header compression/decompression context, when compressing/decompressing a PDCP SDU of the first plurality of PDCP SDUs or when compressing/decompressing a PDCP SDU of the third plurality of PDCP SDUs.

In one example, the step of maintaining the header compression/decompression context may include not resetting a header compression/decompression context. In one example, the communication device and the first base station may compress/decompress the third plurality of PDCP SDUs according to the header compression/decompression context, when the RRC message includes first information indicating maintaining the header compression/decompression context (i.e., continuing header compression/decompression context) for the first radio bearer or maintaining the header compression/decompression context for all radio bearer(s) between the communication device and the first base station. Further, the communication device and the first base station may reset the header compression/decompression context for the first radio bearer or for all the radio bearer(s) used between the communication device and the first base station, when the RRC message does not include the first information or the RRC message includes second information indicating resetting the header compression/decompression context for the first bearer or for all the radio bearer(s) used between the communication device and the first base station. In other words, the communication device and the first base station may not use the header compression/decompression context for compressing/decompressing PDCP SDUs of the first radio bearer, and may establish a new header compression/decompression context in response to an IR packet (i.e., a PDCP SDU which is uncompressed) of the first radio bearer. In one example, the communication device and the first base station may reset a header compression/decompression context for the second radio bearer, when the RRC message indicates the handover from the second base station to the first base station. In one example, the communication device and the second base station may reset the header compression/decompression context for the second radio bearer, when the RRC message changes the PSCell from the cell of the first base station to the other cell of the first base station and indicates the communication device to perform an intra-base station handover within the second base station.

Figure 7:
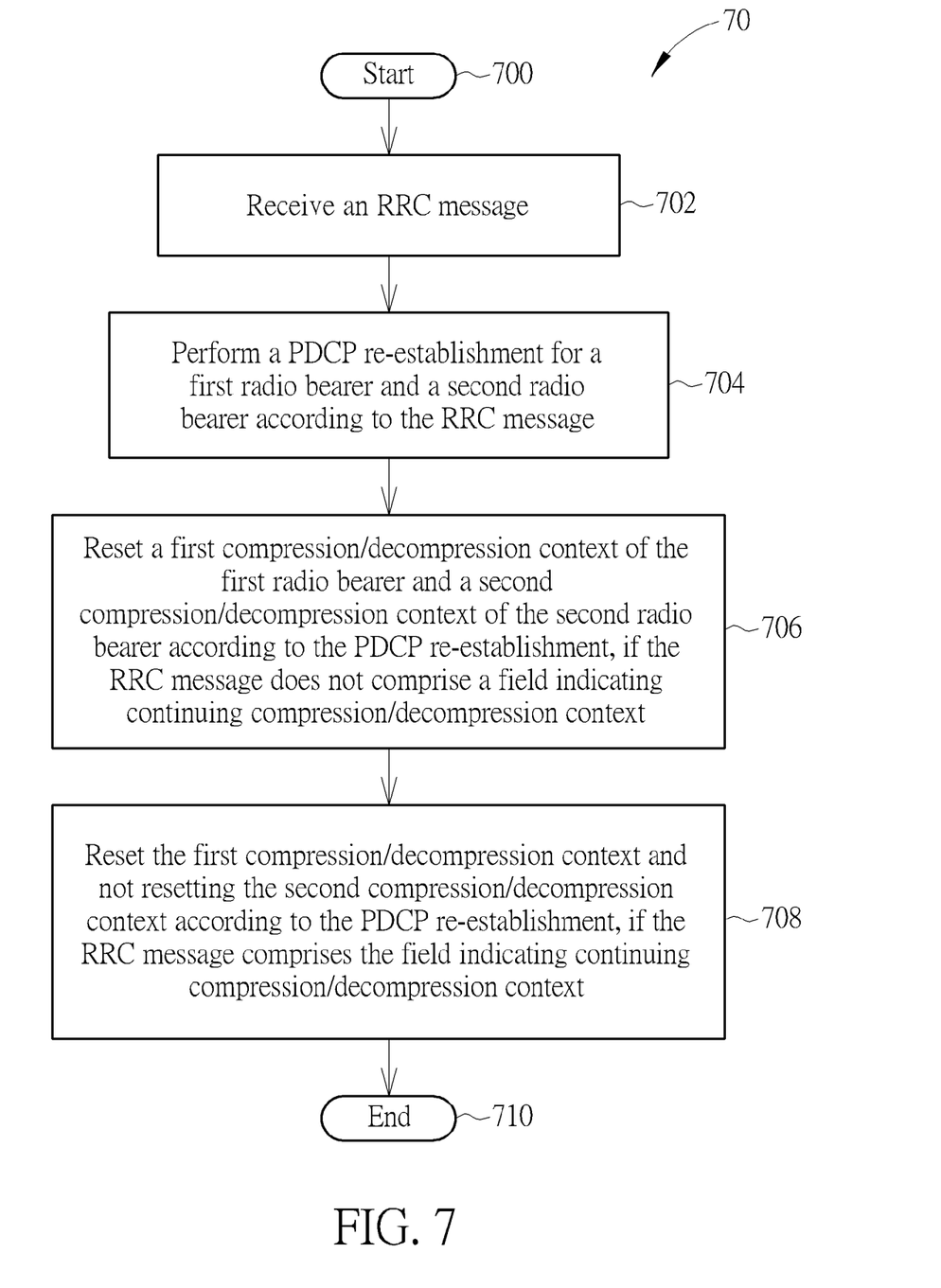
FIG. 7 is a flowchart of a process according to an example of the present invention.

FIG. 7 is a flowchart of a process 70 according to an example of the present invention. The process 70 may be utilized in a communication device (e.g., the communication device 100), to handle a header compression/decompression. The process 70 may be compiled into the program code 214 and includes the following steps:

Step 700: Start.

Step 702: Receive an RRC message.

Step 704: Perform a PDCP re-establishment for a first radio bearer and a second radio bearer according to the RRC message.

Step 706: Reset a first compression/decompression context of the first radio bearer and a second compression/decompression context of the second radio bearer according to the PDCP re-establishment, if the RRC message does not comprise a field indicating continuing compression/decompression context.

Step 708: Reset the first compression/decompression context and not resetting the second compression/decompression context according to the PDCP re-establishment, if the RRC message comprises the field indicating continuing compression/decompression context.

Step 710: End.

According to the process 70, the communication device receives an RRC message, and performs a PDCP re-establishment for a first radio bearer and a second radio bearer according to the RRC message. Then, the communication device may reset a first compression/decompression context of the first radio bearer and a second compression/decompression context of the second radio bearer according to the PDCP re-establishment, if the RRC message does not include a field indicating continuing compression/decompression context. In addition, the communication device may reset the first compression/decompression context and not resetting the second compression/decompression context according to the PDCP re-establishment, if the RRC message includes the field indicating continuing compression/decompression context.

The first compression/decompression context and the second compression/decompression context may be a same compression protocol (e.g., Robust Header Compression (ROHC)) or different compression protocols. The compression/decompression context may be used for compression of PDCP SDUs of a radio bearer by a compressor, if the communication device transmits the compressed PDCP SDUs. The compression/decompression context may be used for decompression of compressed PDCP SDUs by a decompressor if the communication device receives the compressed PDCP SDUs of a radio bearer.

Realization of the process 70 is not limited to the above description.

In one example, the step of resetting the first compression/decompression context may include starting the first compression/decompression context with an IR state in U-mode, if the first compression/decompression context is an ROHC context and is used by a compressor (e.g., for UL). In one example, the step of resetting the first compression/decompression context may include starting the first compression/decompression context with a no context (NC) state in U-mode, if the first compression/decompression context is an ROHC context and is used by a decompressor (e.g., for DL). In one example, an RLC acknowledged mode or a RLC unacknowledged mode may be configured for the first radio bearer and/or the second radio bearer. In one example, the field indicating continuing compression/decompression context may be applied (e.g., only) for the MCG bearer or for the first radio bearer.

In one example, the step of resetting the second compression/decompression context may include resetting the second compression/decompression context, if the RRC message does not include another field indicating continuing compression/decompression context for a SCG or for the second radio bearer, or if the RRC message includes the field indicating resetting compression/decompression context for the SCG or for the second radio bearer. In one example, the communication device may not reset the second compression/decompression context, if the RRC message includes the other field indicating continuing compression/decompression context for the SCG or for the second radio bearer. In one example, the field may be drb-ContinueROHC defined in 3GPP TS 36.331 v12.3.0. In one example, the RRC message may change a PSCell from a cell of the first base station to another cell of the first base station (i.e., PSCell change within the SCG of the first base station) or may indicate a handover from the second station to the first station.

It should be noted that although the above examples are illustrated to clarify the related operations of corresponding processes. The examples can be combined and/or modified arbitrarily according to system requirements and/or design considerations.

It should be noted that the terms of "compressed/decompressed", "compressing/decompressing" and "compression/decompression" are used for reducing redundancy of the description. Those skilled in the art can readily understand that the processes 50, 60, 70 and the above examples can be applied to the header compression context (and related compressing operations and compressed SDUs), the header decompression context (and related decompressing operations and decompressed SDUs), or both. In addition, the terms of "header compression context" and "header decompression context" may also be termed as "header compression protocol context" and "header decompression protocol context", respectively.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

To sum up, the present invention provides a method and related communication device for handling network configurations. Accordingly, a reconfiguration for RLC configuration, PDCP configuration and/or SPS configuration for a MCG and/or a SCG can be performed. The present invention also provides a method and related communication device for handling a header compression/decompression. Thus, efficiency of the header compression/decompression can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling network configurations, comprising:
a storage unit for storing instructions of:
receiving a first configuration configuring a first radio bearer as a master cell group (MCG) bearer from a first base station, wherein the first configuration is for communicating with the first base station;
receiving a second configuration configuring a second radio bearer as a secondary cell group (SCG) bearer from the first base station, wherein the second configuration comprises at least one of a radio link control (RLC) configuration, a packet data convergence protocol (PDCP) configuration and a semi-persistent scheduling (SPS) configuration for communicating with a second base station;
receiving a radio resource control (RRC) message indicating a reconfiguration of the at least one of the RLC configuration, the PDCP configuration and the SPS configuration;
performing the reconfiguration according to the RRC message, when at least one of following conditions is satisfied:
the RRC message changes a SCG of the communication device; and
the RRC message reconfigures the second radio bearer from the SCG bearer to the MCG bearer; and
stopping performing the reconfiguration, when none of the conditions is satisfied; and
a processing means, coupled to the storage unit, configured to execute the instructions stored in the storage unit.

2. The communication device of claim 1, wherein the conditions comprise that:
the RRC message is a first message after an RRC connection re-establishment; and
the RRC message is a handover message.

3. The communication device of claim 2, wherein the conditions comprise that:
the RRC message reconfigures the second radio bearer from the SCG bearer to a split bearer.

4. The communication device of claim 1, wherein the PDCP configuration comprises at least one of a PDCP timer value and a PDCP Sequence Number (SN) size, the RLC configuration comprises at least one of a RLC timer value, a counter value, a RLC Length Indicator (LI) size and a RLC SN size, and the SPS configuration comprises at least one of a SPS Cell Radio Network Temporary Identifier (C-RNTI) and a SPS interval; or the RRC message changing the SCG is an RRCConnectionReconfiguraiton message comprising a MobilityControlInfoSCG information element which comprises at least one of t307, a C-RNTI and RACH-ConfigDedicated.

5. The communication device of claim 1, wherein the communication device stops performing the reconfiguration by ignoring the reconfiguration, and the storage unit further stores an instruction of performing an RRC connection re-establishment procedure when none of the conditions is satisfied.

6. The communication device of claim 1, wherein the instruction of performing the reconfiguration comprises applying the RLC configuration, and the storage unit further stores an instruction of:
reestablishing a RLC entity of the second radio bearer in response to the RRC message;
reestablishing a PDCP entity of the second radio bearer in response to the RRC message; or
resetting a MAC entity of the second radio bearer in response to the RRC message.

7. A first base station for handling network configurations, comprising:
a storage unit for storing instructions of:
transmitting a first configuration configuring a first radio bearer as a master cell group (MCG) bearer to a communication device, wherein the first configuration is for communicating with the first base station;
transmitting a second configuration configuring a second radio bearer as a secondary cell group (SCG) bearer to the communication device, wherein the second configuration comprises at least one of a radio link control (RLC) configuration, and a packet data convergence protocol (PDCP) configuration and a semi-persistent scheduling (SPS) configuration for communicating with a second base station;
determining to reconfigure the at least one of the RLC configuration, the PDCP configuration and the SPS configuration; and
transmitting a radio resource control (RRC) message indicating a reconfiguration of the at least one of the RLC configuration and the PDCP configuration according to the determination, wherein the reconfiguration is performed by the communication device according to the RRC message when at least one of following conditions is satisfied:
the RRC message changes a SCG of the communication device and the RRC message reconfigures the second radio bearer from the SCG bearer to the MCG bearer, and performing of the reconfiguration is stopped by the communication device when none of the conditions is satisfied; and
a processing means, coupled to the storage unit, configured to execute the instructions stored in the storage unit.

8. The first base station of claim 7, wherein the PDCP configuration comprises at least one of a PDCP timer value and a PDCP Sequence Number (SN) size, the RLC configuration comprises at least one of a RLC timer value, a counter value, a RLC Length Indicator (LI) size and a RLC SN size, and the SPS configuration comprises at least one of a SPS Cell Radio Network Temporary Identifier (C-RNTI) and a SPS interval; or the RRC message changing the SCG is an RRCConnectionReconfiguraiton message comprising a MobilityControlInfoSCG information element which comprises at least one of t307, a C-RNTI and RACH-ConfigDedicated.

9. A communication device for handling a header compression/decompression, comprising:
a storage unit for storing instructions of:
receiving a first radio bearer configuration configuring a first radio bearer as a secondary cell group (SCG) bearer and a primary secondary cell (PSCell) configuration configuring a cell of a first base station as a PSCell, wherein the first radio bearer configuration and the PSCell configuration are for communicating with the first base station;
receiving a second radio bearer configuration configuring a second radio bearer as a master cell group (MCG) bearer or a split bearer for communicating with a second base station;
establishing a header compression context for compressing a first plurality of packet data convergence protocol (PDCP) service data units (SDUs) of the first radio bearer, and/or establishing a header decompression context for decompressing a second plurality of PDCP SDUs of the first radio bearer;
compressing the first plurality of PDCP SDUs into a first plurality of compressed PDCP SDUs according to the header compression context and transmitting the first plurality of compressed PDCP SDUs to the first base station, and/or receiving the second plurality of PDCP SDUs from the first base station and decompressing the second plurality of PDCP SDUs into a second plurality of decompressed PDCP SDUs according to the header decompression context;
transmitting a plurality of PDCP SDUs of the second radio bearer to the second base station;
receiving a radio resource control (RRC) message changing the PSCell from the cell of the first base station to another cell of the first base station or indicating a handover from the second base station to the first base station;
maintaining the header compression context or the header decompression context, when receiving the RRC message; and
compressing a third plurality of PDCP SDUs of the first radio bearer into a third plurality of compressed PDCP SDUs according to the header compression context and transmitting the third plurality of compressed PDCP SDUs to the first base station, after receiving the RRC message, and/or receiving a fourth plurality of PDCP SDUs of the first radio bearer and decompressing the fourth plurality of PDCP SDUs into a fourth plurality of decompressed PDCP SDUs according to the header decompression context, after receiving the RRC message; and
a processing means, coupled to the storage unit, configured to execute the instructions stored in the storage unit.

10. The communication device of claim 9, wherein the communication device compresses the third plurality of PDCP SDUs according to the header compression context, when the RRC message comprises first information indicating maintaining the header compression context for the first radio bearer or maintaining the header compression context for at least one radio bearer between the communication device and the first base station; or the storage unit further stores an instruction of:
resetting the header compression context, when the RRC message does not comprise the first information or the RRC message comprises second information indicating resetting the header compression text for the first bearer or for the at least one radio bearer.

11. The communication device of claim 9, wherein the storage unit further stores an instruction of:
resetting a header compression context for the second radio bearer, when the RRC message changes the PSCell from the cell of the first base station to the another cell of the first base station and indicates the communication device to perform an intra-base station handover within the second base station or when the RRC message indicates the handover from the second base station to the first base station.

12. A method of handling a header compression/decompression for a first base station and a second base station, the method comprising:
the second base station transmitting a first radio bearer configuration configuring a first radio bearer as a secondary cell group (SCG) bearer and a primary secondary cell (PSCell) configuration configuring a cell of the first base station as a PSCell to a communication device, wherein the first radio bearer configuration and the PSCell configuration are for communicating with the communication device;
the second base station transmitting a second radio bearer configuration for configuring a second radio bearer as a master cell group (MCG) bearer or a split bearer for communicating with the communication device to the communication device;
the first base station establishing a header compression context for compressing a first plurality of packet data convergence protocol (PDCP) service data units (SDUs) of the first radio bearer, and/or establishing a header decompression context for decompressing a second plurality of PDCP SDUs of the first radio bearer;
the first base station compressing the first plurality of PDCP SDUs into a first plurality of compressed PDCP SDUs according to the header compression context and transmitting the first plurality of compressed PDCP SDUs to the communication device, and/or receiving the second plurality of PDCP SDUs from the communication device and decompressing the second plurality of PDCP SDUs into a second plurality of decompressed PDCP SDUs according to the header decompression context;
the second base station transmitting or receiving a plurality of PDCP SDUs of the second radio bearer to the communication device;
the second base station transmitting a radio resource control (RRC) message changing the PSCell from the cell of the first base station to another cell of the first base station or indicating a handover from the second base station to the first base station;
the first base station maintaining the header compression context or the header decompression context, when initiating changing the PSCell or initiating the handover; and
the first base station compressing a third plurality of PDCP SDUs of the first radio bearer into a third plurality of compressed PDCP SDUs according to the header compression context and transmitting the third plurality of compressed PDCP SDUs to the communication device, after receiving the RRC message, and/or receiving a fourth plurality of PDCP SDUs of the first radio bearer from the communication device and decompressing the fourth plurality of PDCP SDUs into a fourth plurality of decompressed PDCP SDUs according to the header decompression context, after receiving the RRC message.

13. The method of claim 12, wherein the first base station compresses the third plurality of PDCP SDUs according to the header compression context, when the RRC message comprises first information indicating maintaining the header compression context for the first radio bearer or maintaining the header compression context for all radio bearers between the communication device and the first base station; or the method further comprises:
the first base station resetting the header compression context for the first radio bearer or for all radio bearers used between the communication device and the first base station, when the RRC message does not comprise the first information or the RRC message comprises second information indicating resetting the header compression context for the first bearer or for the all radio bearers used between the communication device and the first base station.

14. The method of claim 12, wherein the method further comprises:
the first base station resetting a header compression context for the second radio bearer.

15. The method of claim 12, wherein the method further comprises:
the second base station resetting a header compression context for the second radio bearer, when the RRC message changes the PSCell from the cell of the first base station to the another cell of the first base station.

16. A communication device for handling a header compression/decompression, comprising:
a storage unit for storing instructions of:
receiving a radio resource control (RRC) message;
performing a packet data convergence protocol (PDCP) re-establishment for a first radio bearer and a second radio bearer according to the RRC message;
resetting a first compression/decompression context of the first radio bearer and a second compression/decompression context of the second radio bearer according to the PDCP re-establishment, if the RRC message does not comprise a field indicating continuing compression/decompression context; and
resetting the first compression/decompression context and not resetting the second compression/decompression context according to the PDCP re-establishment, if the RRC message comprises the field indicating continuing compression/decompression context; and
a processing means, coupled to the storage unit, configured to execute the instructions stored in the storage unit.

17. The communication device of claim 16, wherein the field indicating continuing compression/decompression context is applied for the MCG bearer or for the first radio bearer.

18. The communication device of claim 16, wherein the instruction of resetting the second compression/decompression context comprises:
resetting the second compression/decompression context, if the RRC message does not comprise another field indicating continuing compression/decompression context for a SCG or for the second radio bearer, or if the RRC message comprises the field indicating resetting compression/decompression context for the SCG or for the second radio bearer; or
not resetting the second compression/decompression context, if the RRC message comprises the another field indicating continuing compression/decompression context for the SCG or for the second radio bearer.

19. The communication device of claim 16, wherein the RRC message changes a primary secondary cell (PSCell) from a cell of the first base station to another cell of the first base station or indicates a handover from the second station to the first station.

* * * * *